(12) United States Patent
Wang

(10) Patent No.: US 6,256,387 B1
(45) Date of Patent: Jul. 3, 2001

(54) DEVICE RACK

(76) Inventor: Chin-Yang Wang, No. 271, Zhen Chyan Street, Shul Lin, Taipei Hsien (TW)

( * ) Notice: Subject to any disclaimer, the term of this patent is extended or adjusted under 35 U.S.C. 154(b) by 0 days.

(21) Appl. No.: 09/348,054

(22) Filed: Jul. 6, 1999

(51) Int. Cl.[7] .................................................... H04M 1/00
(52) U.S. Cl. ........................................... 379/446; 379/455
(58) Field of Search .................................. 379/446, 426, 379/455, 454, 449

(56) References Cited

U.S. PATENT DOCUMENTS

| | | | |
|---|---|---|---|
| 5,457,745 | * 10/1995 | Wang | 379/446 |
| 5,555,302 | * 9/1996 | Wang | 379/446 |
| 5,694,468 | * 12/1997 | Hsu | 379/446 |
| 5,788,202 | * 8/1998 | Richter | 379/446 |

* cited by examiner

*Primary Examiner*—Jack Chiang
(74) *Attorney, Agent, or Firm*—Dougherty & Troxell

(57) ABSTRACT

A device rack, which includes a base frame having an upright annular flange and an upright peripheral wall around the upright annular flange, a rotary disk ratably coupled to the upright annular flange inside the base frame and partially peripherally projecting out of the base frame for rotation by hand, the rotary disk having a spiral groove at a front side, two angled clamping members coupled to the rotary disk and moved relative to each other upon a rotary motion of the rotary disk, the clamping members each having a bottom rod inserted into the spiral groove at the rotary disk, and a platform covered on the base frame over the rotary disk to hold the rotary disk and the clamping members in place.

7 Claims, 3 Drawing Sheets

DEVICE RACK

BACKGROUND OF THE INVENTION

The present invention relates to a device rack for holding, for example, a cellular phone, and more particularly to such a device rack, which comprises two symmetrical clamping members moved relative to each other by means of the control of a rotary disk for clamping an article, for example, a cellular phone on a platform.

Various device racks have been disclosed for use to hold an article, for example, a cellular phone. These device racks commonly use clamping means to hold the article. A device rack for this purpose must be conveniently adjustable to fit articles of different sizes. The clamping means must be designed to provide proper clamping force without causing a damage to the article. Conventionally, spring means are used in device racks to impart a pressure to the clamping means against the article. However, the installation of the spring means is complicated. When spring means is used, complicated adjustment means shall be installed, so that the clamping means can be moved to adjust the pitch subject to the size of the article to be held. Further, when the spring power of the spring means is suddenly released, the installed article may be damaged.

SUMMARY OF THE INVENTION

The present invention has been accomplished to provide a device rack, which eliminates the aforesaid drawbacks. According to one aspect of the present invention, the device rack comprises a base frame having an upright annular flange and an upright peripheral wall around the upright annular flange, a rotary disk ratably coupled to the upright annular flange inside the base frame and partially peripherally projecting out of the base frame for rotation by hand, the rotary disk having a spiral groove at a front side, two angled clamping members coupled to the rotary disk and moved relative to each other upon a rotary motion of the rotary disk, the clamping members each having a bottom rod inserted into the spiral groove at the rotary disk, and a platform covered on the base frame over the rotary disk to hold the rotary disk and the clamping members in place.

According to another aspect of the present invention, the clamping members each have parallel sliding ribs, and the platform has parallel sliding grooves respectively coupled to the sliding ribs at the clamping members to guide movement of the clamping members upon rotary motion of the rotary disk.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
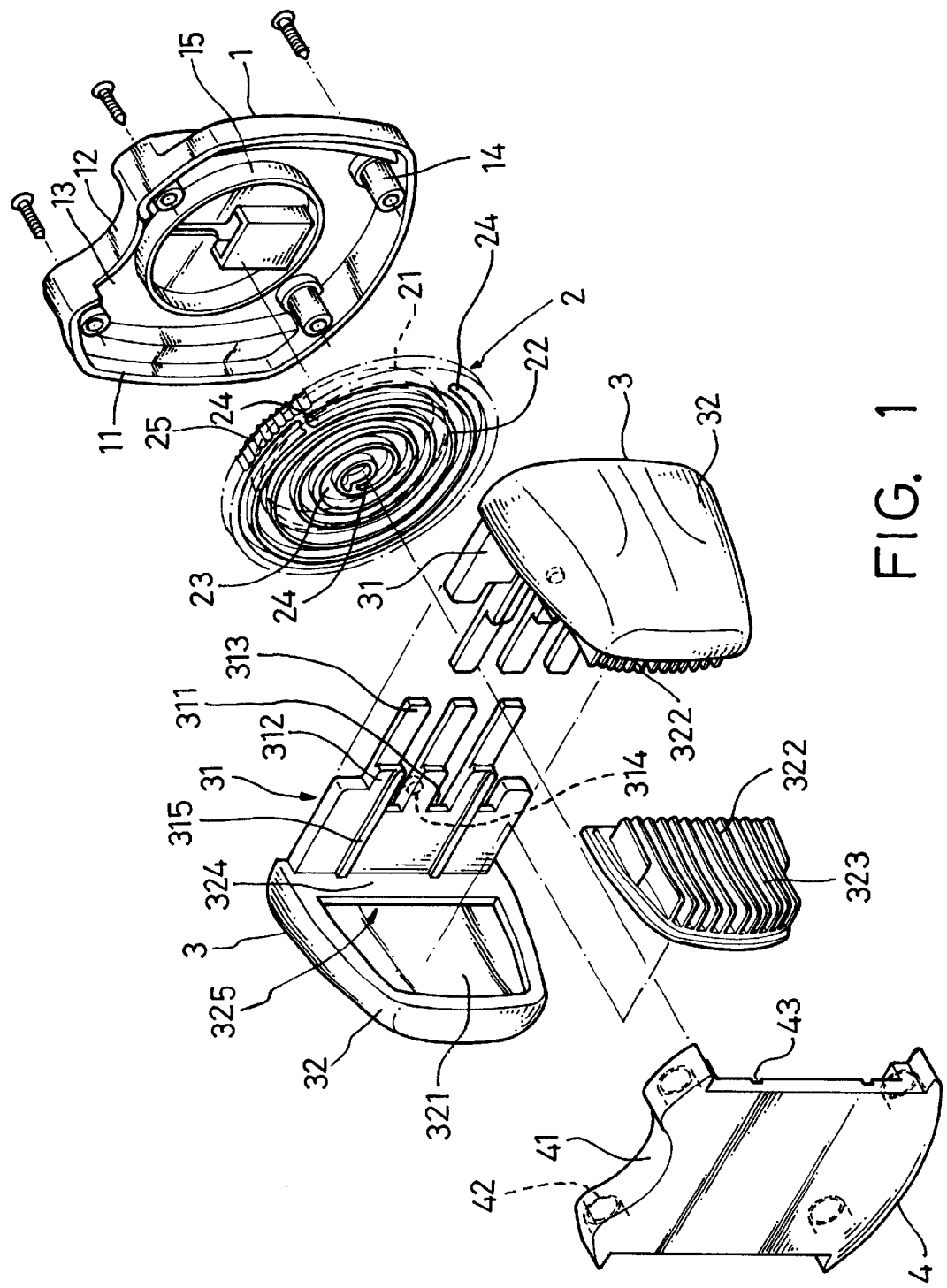
FIG. 1 is an exploded view of a device rack according to the present invention.
Figure 2:
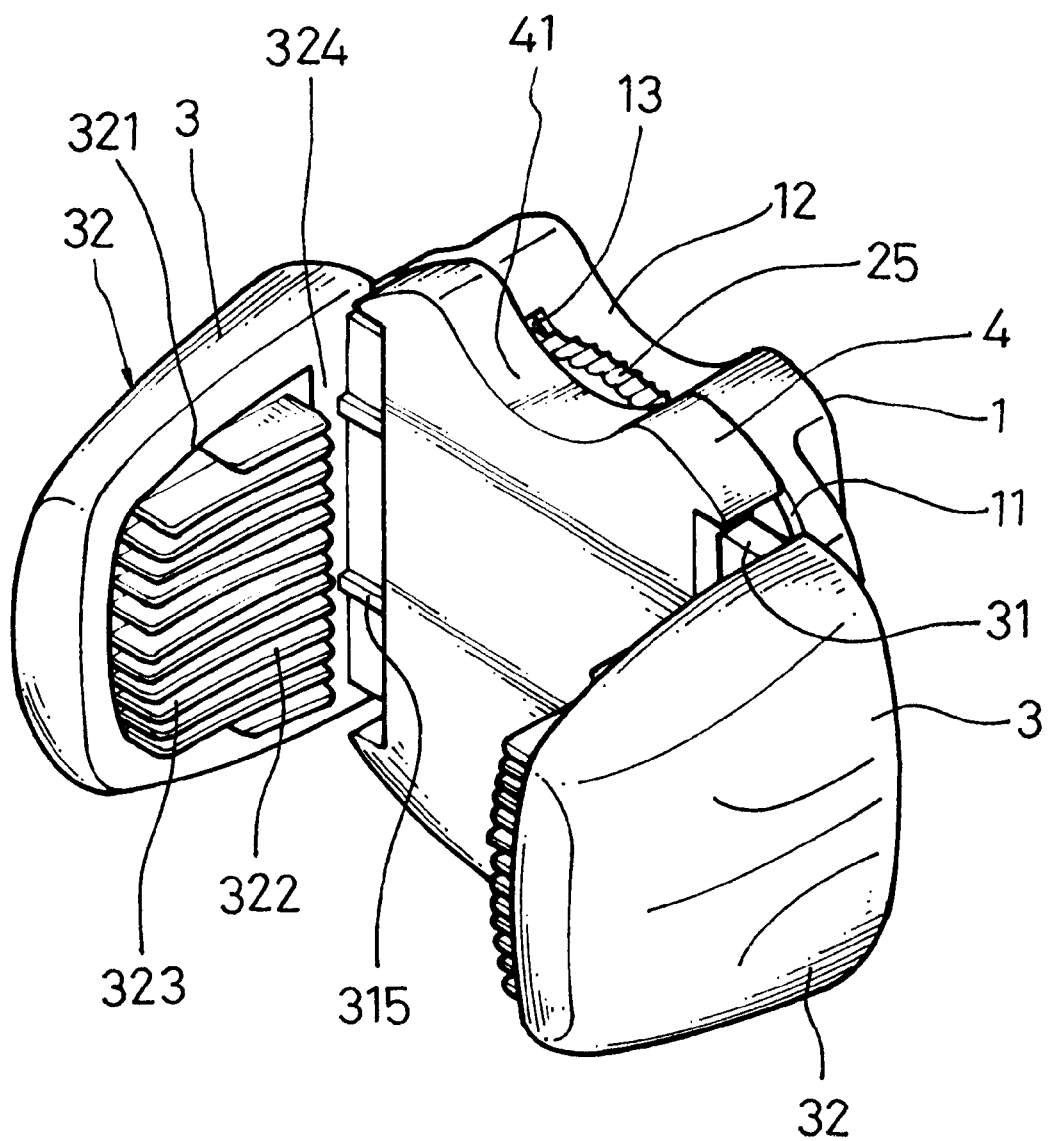
FIG. 2 is a perspective assembly view of the device rack shown in FIG. 1.
Figure 3:
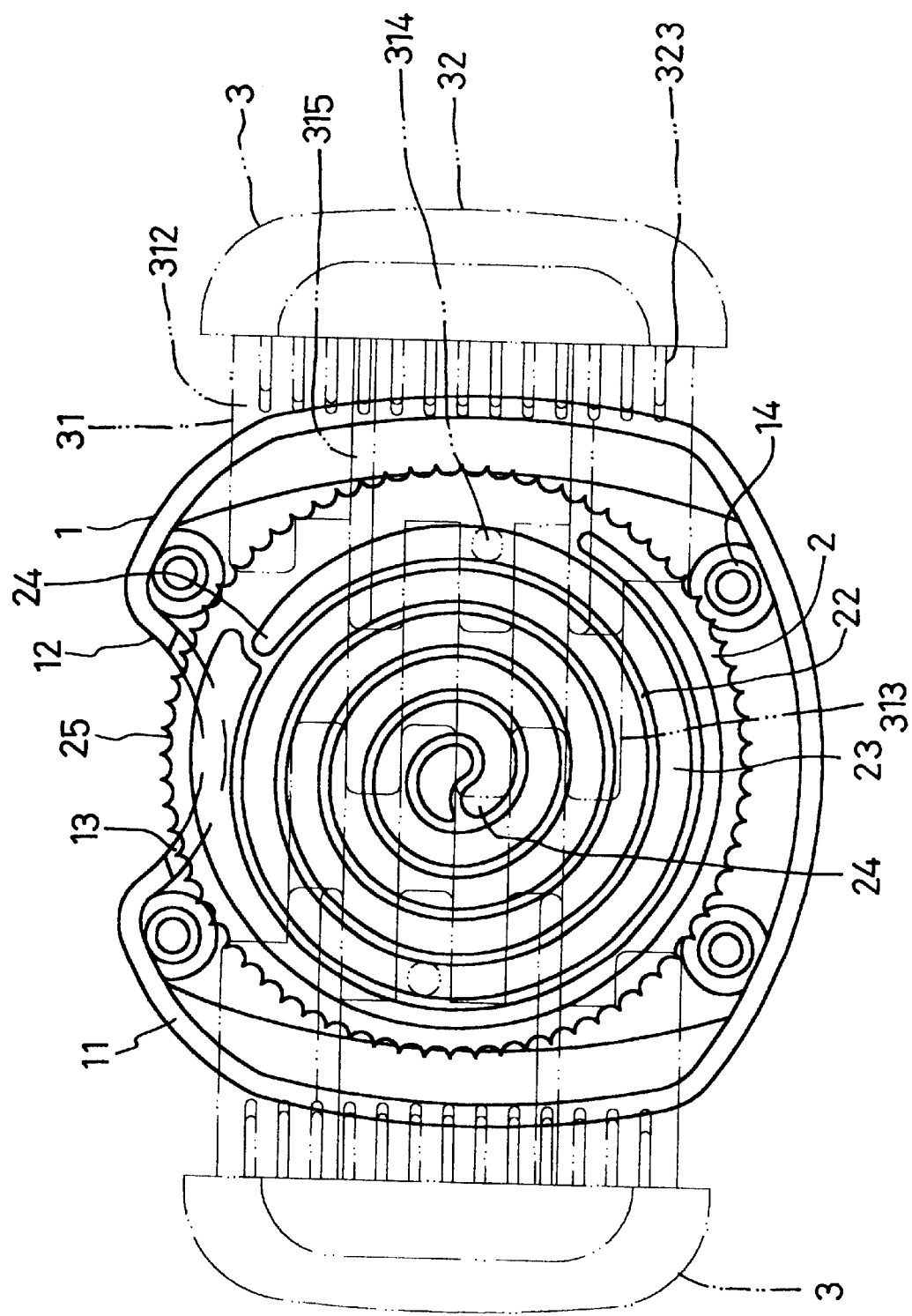
FIG. 3 is a sectional view in an enlarged scale of the present invention, showing the relationship between the clamping members and the rotary disk.

Referring to FIGS. from 1 through 3, a device rack is shown comprised of a base frame 1, a rotary disk 2, a platform 4, and two clamping members 3.

The base frame 1 is a flat, hollow member comprising an upright peripheral wall 11 having a curved wall portion 12 curved inwards at one side, a top notch 13 at the curved wall portion 12 of the upright peripheral wall 11, an upright annular flange 15 raised from the inside at the center, and a plurality of stub mounting barrels 14 spaced around the upright annular flange 15. Further, mounting means, for example, mounting slots may be provided at the base frame 1, enabling the base frame 1 to be fastened to an external support.

The rotary disk 2 is a flat circular member comprising an endless coupling groove 21 at the back side wall thereof for coupling to the upright annular flange 15 at the base frame 1, a plurality of spiral upright walls 22 raised from the front side wall thereof and defining a spiral sliding groove 23, stop members 24 respectively disposed at inner and outer ends of the spiral sliding groove 23, and a toothed peripheral wall 25. The rotary disk 2 is mounted in the base frame 1 within the upright peripheral wall 11. After installation, the toothed peripheral wall 25 of the rotary disk 2 projecting out of the base frame 1 through the top notch 13 at the curved wall portion 12 for turning by hand.

The clamping members 3 are symmetrical, each comprising a horizontal base 31 and a vertical plate 32 connected at right angles, and a clamping head 322. The horizontal base 31 comprises a plurality of elongated notches 311 and fingers 312 alternatively arranged in parallel at a front side thereof remote from the vertical plate 32, a plurality of extension tips 313 of relatively thinner thickness respectively and forwardly extended from the fingers 312, a bottom rod 314 perpendicularly raised from the bottom side of one finger 312 for insertion into the spiral sliding groove 23 at the rotary disk 2, and at least one for example two sliding ribs 315 for coupling to the platform 4. The vertical plate 32 comprises a front side wall 324 perpendicularly connected to the horizontal base 31, a recessed portion 321 at the front side wall 324, and a positioning groove 325 in the recessed portion 321. The clamping head 322 is a flexible member press-fitted into the recessed portion 321 and fastened to the positioning groove 325, having parallel fins 323 raised from the front side wall thereof.

The platform 4 is covered on the base frame 1 to hold the rotary disk 2 in place, having a curved peripheral wall 41 fitting the curved wall portion 12 at the upright peripheral wall 11 of the base frame 1, a plurality of bottom mounting holes 42 respectively connected to the stub mounting barrels 14 at the base frame 1 by screws, and a plurality of sliding grooves 43 formed on the bottom side wall thereof and respectively coupled to the sliding ribs 315 at the clamping members 3.

During assembly process, the rotary disk 2 is mounted in the base frame 1, enabling the upright annular flange 15 of the base frame 1 to be inserted into the coupling groove 21 at the rotary disk 2, then the clamping members 3 are attached to the rotary disk 2, enabling the bottom rod 314 of each clamping member 3 to be inserted into the spiral sliding groove 23 and the extension tips 313 of one clamping member 3 to be inserted into the notches 311 at the other, and then the platform 4 is covered on the base frame 1 over the rotary disk 2 and fixedly secured thereto by screws.

When assembled, the toothed peripheral wall 25 can be pushed with the fingers, causing the rotary disk 2 to be rotated. By rotating the rotary disk 2 clockwise/counterclockwise, the pitch between the clamping members 3 is relatively adjusted subject to the size of the article to be held. Because the bottom rod 314 of each clamping member 3 is respectively inserted into the spiral sliding groove 23 at the rotary disk 2, the clamping members 3 are smoothly moved relative to each other when the rotary disk 2 is rotated. Further, because the clamping members 3 are identical, the mold tool and assembly cost can be relatively reduced.

While only one embodiment of the present invention has been shown and described, it will be understood that various modifications and changes could be made thereunto without departing from the spirit and scope of the invention disclosed.

What the invention claimed is:

1. A device rack comprising:

a base frame, said base frame comprising an upright peripheral wall, and an upright annular flange raised from an inside wall thereof and surrounded by said upright peripheral wall;

a rotary disk mounted on said upright annular flange within said base frame, said rotary disk comprising a bottom coupling groove formed on a back side wall thereof and coupled to said upright annular flange inside said base frame for allowing said rotary disk to be rotated on said upright annular flange, upright spiral walls raised from a front side wall thereof and defining a spiral sliding groove;

two symmetrical clamping members coupled to said rotary disk and moved relative to each other for clamping an object put in therebetween, said clamping members each comprising a horizontal base and a vertical plate connected at right angles, said horizontal base comprising a plurality of elongated notches and fingers alternatively arranged in parallel at a front side thereof remote from said vertical plate, a plurality of extension tips respectively and forwardly extended from said fingers, and a bottom rod perpendicularly raised from one of said fingers at a bottom side and inserted into the spiral sliding groove at said rotary disk, said extension tips having a size fitting said elongated notches; and a platform covered on said base frame;

wherein rotating said rotary disk causes said clamping members to be moved relative to each other.

2. The device rack of claim 1 wherein said upright peripheral wall of said base frame comprises a curved wall portion curved inwards, and a top notch at said curved wall portion through which a part of the periphery of said rotary disk projects outside said base frame; said platform has a curved peripheral wall fitting the curved wall portion at the upright peripheral wall of said base frame.

3. The device rack of claim 1 wherein said rotary disk comprises a toothed peripheral wall.

4. The device rack of claim 1 wherein said clamping members each further comprise a clamping head mounted on the respective vertical plate, and the vertical plate of each of said clamping members comprises a front side wall, a recessed portion at said front side wall, which receives the respective clamping head, and a positioning groove in said recessed portion to which the respective clamping head is fastened.

5. The device rack of claim 1 wherein said base frame comprises mounting means for securing to an external support.

6. The device rack of claim 1 wherein said base frame comprises a plurality of stub mounting barrels, and said platform comprises a plurality of bottom mounting holes respectively fastened to the stub mounting barrels at said base frame by fastening elements.

7. The device rack of claim 1 wherein the horizontal base of each of said clamping members comprises a plurality of top sliding ribs extending in same direction of said fingers, and said platform comprises a plurality of bottom sliding grooves respectively coupled to the sliding ribs at said clamping members.

* * * * *